United States Patent
Hohberger

[15] 3,665,948
[45] May 30, 1972

[54] TRANSIENT REDUCTION APPARATUS FOR HYDRAULIC SYSTEM

[72] Inventor: Clive P. Hohberger, Port Jefferson, N.Y.
[73] Assignee: Allen-Bradley Company, Wilwaukee, Wis.
[22] Filed: July 6, 1970
[21] Appl. No.: 52,519

[52] U.S. Cl. .............................................137/81.5, 73/392
[51] Int. Cl. .........................................................F15c 1/16
[58] Field of Search ...........137/81.5; 73/392; 138/26, 44–46

[56] References Cited

UNITED STATES PATENTS

| | | | |
|---|---|---|---|
| 1,694,838 | 12/1928 | Bayha | 73/392 |
| 1,943,954 | 1/1934 | Durner | 138/26 |
| 2,191,990 | 2/1940 | Jordan | 73/392 |
| 2,347,903 | 5/1944 | Gluck et al. | 73/392 |
| 2,370,965 | 3/1945 | Kahn | 138/46 |
| 2,893,432 | 7/1959 | Gibson | 138/26 |
| 3,402,608 | 9/1968 | Nishigori | 73/392 |

Primary Examiner—William R. Cline
Attorney—Arnold J. Ericsen and Richard C. Steinmetz, Jr.

[57] ABSTRACT

Apparatus for coupling a hydraulic line to a pressure gauge, to reduce the level of high pressure transients that are applied to the guage, comprising a housing with an inlet connected to the hydraulic line, a variable volume chamber coupled to the inlet through a small diameter passageway orifice, and a narrow diameter passageway connecting the chamber to the pressure gauge. The orifice which connects the inlet to the chamber is oriented to direct a jet of oil at an angle, such as 30° to 45° with the chamber walls, to create a vortex in the chamber so that the incoming jet pressure wave is well mixed with the fluid contained in the chamber volume, thereby reducing localized pressure pulses or shock waves that could pass through the chamber to the gauge.

5 Claims, 2 Drawing Figures

Patented May 30, 1972

3,665,948

INVENTOR
CLIVE P. HOHBERGER
BY Lindenberg, Freilich
& Wasserman
ATTORNEYS ly accommodated, very high pressure bursts can damage sensitive pressure transducers which are generally used in the system.

TRANSIENT REDUCTION APPARATUS FOR HYDRAULIC SYSTEM

BACKGROUND OF THE INVENTION

1. Field of the Invention

This invention relates to hydraulic apparatus, and more particularly, to apparatus for coupling pressure gauges to a hydraulic system.

2. Description of the Prior Art

In very high bandwidth (fast response) hydraulic drive systems, very high pressure transients may be produced when a hydraulic motor, cylinder, or other device is instantly commanded to reverse its direction. For example, a pressure transient which reaches a level of 10,000 psi (pounds per square inch) or more for periods of a few milliseconds may be produced where a hydraulic motor operating at high speed is suddenly reversed. While moderately high pressures are readily accomodated, very high pressure bursts can damage sensitive pressure transducers which are generally used in the system.

Some types of pressure gauges or transducers, such as the strain gauge/volume type have a very fast response, so they are often used to achieve close control of a high bandwidth system. The strain gauge/volume type transducer employs a cylinder whose inside is connected to the hydraulic fluid, and which has a strain gauge wrapped around its outer wall to sense expansion caused by fluid pressure. Such a gauge has an extremely low trapped volume and thus a high frequency response over a wide range, with a natural resonant frequency generally above 1,000 cps (cycles per second). Thin cylinder walls are employed to achieve high sensitivity, but this results in a small margin between maximum operating pressure and burst pressure, such as 150 percent. For example, a gauge designed to sense dynamic pressures up to 3000 psi may have a burst pressure of only 4,500 psi. However, a motor intended for use in the system might generate a pressure transient of over 12,000 psi which lasted for a few milliseconds, when the motor was reversed while running at high speed. The pressure gauge must be isolated from such a transient so that the pressure rises to only a moderate level at the gauge.

One method which can be employed to reduce the level of transients impressed upon a pressure transducer is the use of a housing with a chamber. One end of the chamber is connected to the hydraulic line and the other end is connected to the transducer, so that the transient pressure is reduced as it is used to raise the pressure of all the fluid in the chamber. However, pressure transients tend to propagate as shock waves, thereby reducing the effective mixing volume, so that a large transient will be impressed on the transducer even though the general pressure level in the chamber has not risen appreciably.

OBJECTS AND SUMMARY OF THE INVENTION

An object of the present invention is to provide apparatus for coupling a hydraulic line to a pressure transducer, which reduces the level of pressure transients impressed upon the transducer in a controlled and predictable manner.

Another object is to provide apparatus for coupling a pressure transducer to a hydraulic line, which permits controlled adjustment of the degree of reduction of pressure transients sensed by the transducer.

In accordance with one embodiment of the invention, a manifold is provided which has an inlet for coupling to a hydraulic line and an outlet for coupling to a pressure transducer, for coupling pressure from the line to the transducer in a manner to limit pressure transients. The manifold includes a chamber connected to the inlet through a small diameter orifice or passageway. The orifice and chamber walls are oriented so that a fluid jet from the orifice is directed at the opposite wall of the chamber at an angle of about 30° to 45° with the surface. This causes the fluid jet to create a vortex that helps in mixing the fluid jet with the rest of the oil in the chamber, or in other words, helps to more evenly distribute the pressure pulse. Another passageway couples the chamber to the outlet which is connected to the transducer, to couple pressure in the chamber to the transducer.

The chamber is constructed to enable variation in its volume so as to vary the amount of reduction of pressure transients.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
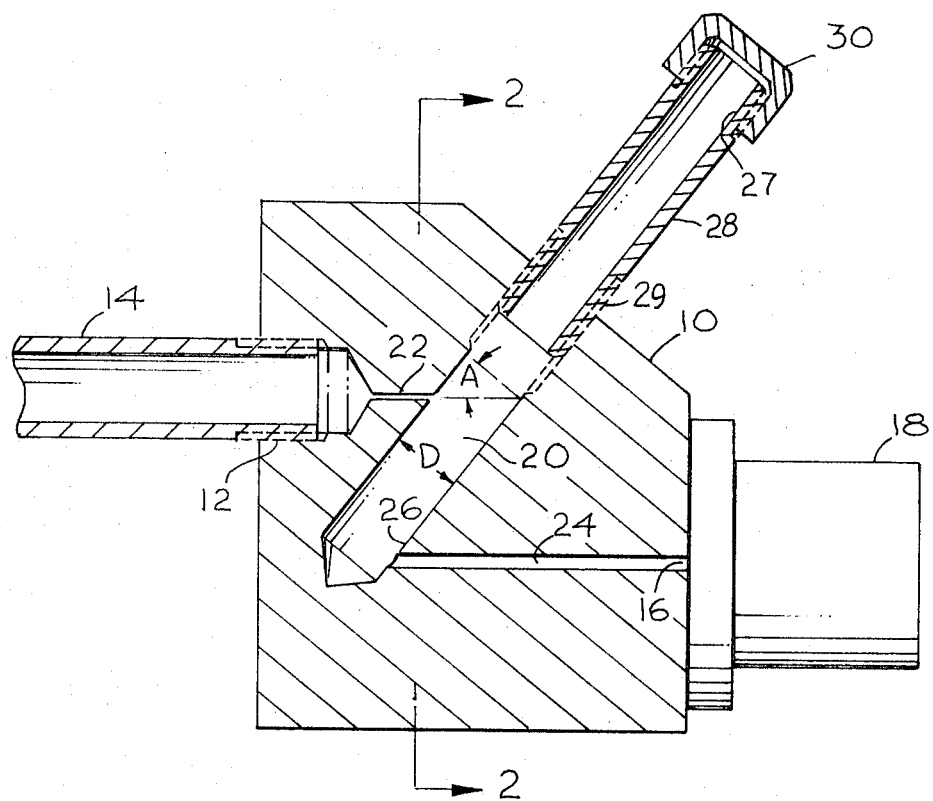
FIG. 1 is a sectional side view of transient reduction apparatus constructed in accordance with the invention.

FIG. 1 illustrates a pressure transient reduction apparatus including a housing 10 which serves as a manifold, the housing having an inlet 12 for coupling to a hydraulic line 14 and an outlet 16 for coupling to a pressure gauge or transducer 18. A chamber 20 is formed in the housing, which is coupled through a first passageway 22 to the inlet 12 and through a second passageway 24 to the outlet 16. The chamber 20, which is filled with oil, couples pressure from the inlet to the outlet while dissipating pressure transients in a controllable manner.

The passageway 22 which couples the inlet 12 to chamber 20 is of a predetermined small diameter and of a length substantially greater than its diameter, so that it serves as an orifice to restrict the flow of fluid from the hydraulic line 14 to the chamber. Accordingly, a sudden surge of fluid pressure propogated through the larger diameter hydraulic line 14 results in a relatively small surge of fluid flowing through the passageway 22 into the chamber 20. The passageway flow rate is greatly restricted by the rapid change in cross-section between the inlet 12 and the passageway (orifice) 12. The large hydraulic impedance of the passageway 22, which has a large length to diameter ratio, restricts and dissipates part of the energy contained in the pressure transient in forming the jet stream exiting from it into the chamber 20. This reduces the rate of transfer of energy from the pressure transient into the chamber. The passageway preferably has a length greater than its diameter, and generally the length should be more than ten times the diameter. In the case of a passageway with a noncircular section, the diameter may be taken as the diameter of an imaginary circle having the same area as the cross-section of the passageway.

Figure 2:
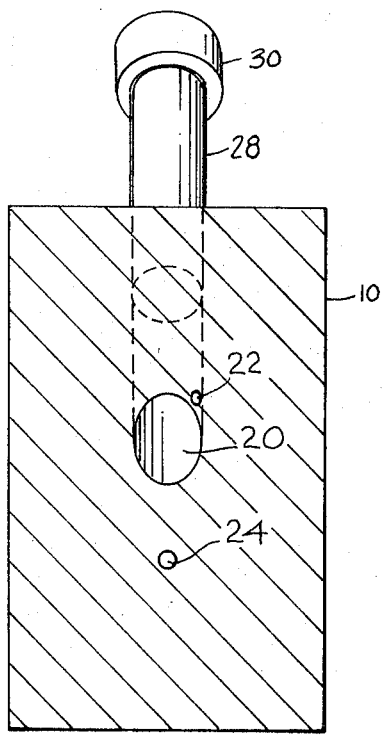
FIG. 2 is a view taken on the line 2—2 of FIG. 1.

The passageway 22 is directed so that the jet stream from it is oriented at an angle A of at least several degrees, and preferably about 45° to 60° from a normal to the surface of the opposite wall of the chamber 20, that is, with a directional component along the length of the chamber towards an end portion 27 thereof. In addition, as shown in FIG. 2, the passageway 22 is located near the periphery of the cylindrical chamber 20. As a result, a fluid jet from the passageway 22 tends to swirl around the chamber in a helical path or vortex, rather than creating a shock wave that passes directly across the width or length of the chamber. The angle A should be substantially greater than zero, and preferably at least about 45° in order to direct the vortex along the length of the chamber. It is preferable to provide an angle A of less than about 60° to resist creation of a shock wave traveling directly along the chamber.

The vortex action set up by the jet stream entering at passageway 22 results in the pressure transient being distributed substantially uniformly throughout the volume of the chamber, and prevents localized high pressure regions such as would be produced by a shock wave traveling directly across the chamber. This construction may be compared to some proposed transient reduction chambers which have an inlet at one end and a transducer connected at the other end. A shock wave can pass through such a chamber to impose a high transient on the transducer, because the shock wave does not have to uniformly raise the pressure throughout the chamber.

The passageway 24 which couples the chamber to the transducer 18, leads from an end portion 26 of the chamber 20 which is opposite the end portion 27 towards which a jet swirls into the chamber. The region at 26 experiences a pressure rise only after the influence of the vortex has entirely permeated the chamber so that the entire chamber pressure has been raised, to further reduce the influence of any traveling shock wavefront on the transducer.

The chamber 20 is formed by a recess in the housing 10 and by a pipe 28 in communication with the recess. The pipe 28 has an end cap 30 at one end, and is threadably coupled by threads 29 to the housing at its other end. By screwing the pipe 28 in and out, or otherwise changing its length, the volume of the chamber 20 can be varied. The volume of chamber 20 determines the pressure transient duration which is required to raise the chamber pressure to a certain proportion of the transient pressure. Thus, the transducer 18 can be made more or less sensitive to transients by screwing the pipe 28 in or out, respectively, to vary the chamber volume.

The amount of transient regulation depends primarily upon the size and length of the passageway 22 in proportion to the volume of the chamber 20. In one pressure reduction system for use with a pressure transducer 18 of the strain gauge/volume type, and a five-sixteenths inch inside diameter hydraulic line 14, a passageway 22 was used which was of 0.015 inch diameter and 0.2 inch length. The chamber 20 had a diameter D of five-sixteenths inch and a total volume of about 0.3 cubic inch. The line 14 was normally used to carry static pressures of up to about 2,000 psi. Pressure transients of about 12,000 psi and lasting for a few milliseconds resulted in a pressure measurement at the transducer 18 of about 4,500 psi. The transducer used at the outlet was capable of responding to transients lasting for as small a period as about one-tenth millisecond, but was substantially insulated from such transients by the transient reducing apparatus. The cross-sectional area of the orifice or passage 22 should be at least an order of magnitude (one-tenth) smaller than the cross-sectional area of the inlet 12 or chamber 20, and preferably should be at least about two orders of magnitude (one one-hundredth) smaller.

Thus, the invention provides apparatus for reducing pressure transients in hydraulic systems, by the use of a constricting passageway (orifice) leading to a chamber that is much larger than the passageway, and by orienting the passageway so that the jet stream enters the chamber at an angle of at least several degrees from a normal to the chamber surface at which it is aimed. This results in a swirling action which causes a more uniform rise in chamber pressure and the reduction in shock wavefronts passing through the chamber. In addition, a passageway leading from the chamber to the transducer is coupled to a portion of the chamber at an end opposite the end at which the entering swirling jet stream is directed. The chamber may be constructed using at least two members which can move relative to each other to enable variation in chamber volume, to thereby enable controllable variation in transient reduction. However, even if the chamber volume is not easily varied, it is accurately known, and therefore, the reduction in transient pressures can be accurately calculated. The use of the threadably coupled pipe 28 allows an accurate choice of chamber volume, even if the volume is later fixed by welding the pipe in place.

The chamber 20 largely acts as a filter to reduce the level of transients reaching the pressure transducer. The use of a chamber whose volume can be accurately selected, enables accurate calculation of energy transfer, so that the amount of pressure reduction is known. It may be noted that the effect of certain other fluid filtering devices such as porous plugs are not easily predicted, while other devices such as piston systems have moving parts and have undesirable hysteresis effects. The device of the present invention is simple, predictable in performance, has no rapidly moving parts, and can be readily adjusted.

Although particular embodiments of the invention have been described and illustrated herein, it is recognized that modifications and variations may readily occur to those skilled in the art, and consequently, it is intended that the claims be interpreted to cover such modifications and equivalents.

The embodiments of the invention in which an exclusive property or privilege is claimed are as follows:

1. Apparatus for reducing pressure transients in a hydraulic system comprising:

a housing having an inlet for coupling to said hydraulic system, an outlet for coupling to a pressure transducer, walls defining a chamber with first and second opposite end portions, a first passageway coupling said inlet to said chamber and a second passageway coupling said chamber to said outlet;

said first passageway having a cross-section smaller than the cross-section of said chamber, and said first passageway located between said first end portion of said chamber and said second passageway and oriented to direct a jet of fluid into the chamber with a directional component toward said first end portion of said chamber.

2. The apparatus described in claim 1 wherein:

said chamber has a substantially cylindrical portion, and an end of said first passageway is formed substantially flush with the walls of said chamber and is oriented with a directional component circumferential to the cylindrical walls to direct a fluid stream into said cylindrical portion so that said stream follows a substantially helical path towards said first-end portion of said chamber.

3. Apparatus for reducing pressure transients in a hydraulic system comprising:

means defining an elongated chamber with first and second opposite end portions;

means defining an inlet for coupling to said hydraulic system;

means defining a first passageway substantially smaller in cross-section than said inlet and smaller in cross-section than said chamber for coupling said inlet to said chamber;

means defining an outlet passageway coupled to said chamber;

said first passageway oriented to direct a stream of fluid into said chamber so that it spirals therein towards said first end portion of said chamber; and said outlet passageway is coupled to said second end portion of said chamber.

4. The apparatus described in claim 3 wherein:

said hydraulic system includes a line with a predetermined internal cross-section for coupling to said inlet:

said chamber has a predetermined minimum cross-section; and

The cross-sectional area at said first passageway is less than one-hundredth the cross-sectional area of either said line of said chamber.

5. Apparatus for reducing pressure transients in a hydraulic system comprising:

means defining an elongated chamber with first and second opposite end portions, including a first hollow member and a second hollow member moveable towards and away from said first member to vary the volume of said chamber;

means defining an inlet for coupling to said hydraulic system;

means defining a passageway substantially smaller in cross-section than said inlet and smaller in cross-section than said chamber for coupling said inlet to said chamber;

means defining an outlet passageway coupled to said chamber;

said first passageway oriented to direct a stream of fluid into said chamber so that it spirals therein towards said first end portion of said chamber; and said outlet is coupled to said second end portion of said chamber.

* * * * *